(12) United States Patent
Chakraborty et al.

(10) Patent No.: US 10,631,159 B2
(45) Date of Patent: Apr. 21, 2020

(54) UE CAPABILITY REPORTING FOR DUAL-POLARIZATION WIRELESS COMMUNICATION

(71) Applicant: QUALCOMM Incorporated, San Diego, CA (US)

(72) Inventors: Kaushik Chakraborty, San Diego, CA (US); Sumeeth Nagaraja, San Diego, CA (US); Tao Luo, San Diego, CA (US); Sony Akkarakaran, Poway, CA (US); Makesh Pravin John Wilson, San Diego, CA (US); Aitzaz Ahmad, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 15/419,255

(22) Filed: Jan. 30, 2017

(65) Prior Publication Data
US 2018/0063693 A1 Mar. 1, 2018

Related U.S. Application Data

(60) Provisional application No. 62/382,627, filed on Sep. 1, 2016.

(51) Int. Cl.
| | |
|---|---|
| *H04W 8/00* | (2009.01) |
| *H04B 7/08* | (2006.01) |
| *H04B 7/06* | (2006.01) |
| *H04W 48/16* | (2009.01) |

(Continued)

(52) U.S. Cl.
CPC .......... *H04W 8/005* (2013.01); *H04B 7/0608* (2013.01); *H04B 7/0802* (2013.01); *H04W 48/16* (2013.01); *H04W 72/04* (2013.01); *H04B 7/0469* (2013.01); *H04B 7/0617* (2013.01)

(58) Field of Classification Search
CPC ..... H04W 48/16; H04W 72/04; H04W 8/005; H04B 7/0469; H04B 7/0608; H04B 7/0617; H04B 7/0802
See application file for complete search history.

(56) References Cited

U.S. PATENT DOCUMENTS

| | | |
|---|---|---|
| 8,467,363 B2 | 6/2013 | Lea et al. |
| 8,792,586 B2 | 7/2014 | Ko et al. |

(Continued)

OTHER PUBLICATIONS

International Search Report and Written Opinion—PCT/US2017/044709—ISA/EPO—dated Oct. 30, 2017.

*Primary Examiner* — Rina C Pancholi
(74) *Attorney, Agent, or Firm* — Arent Fox LLP

(57) ABSTRACT

In an aspect of the disclosure, a method, a computer-readable medium, and an apparatus are provided. The apparatus may be a user equipment (UE). The UE reports antenna capability information of the UE, the antenna capability information comprising identification information of each of one or more antenna subarrays and polarization information indicating at least one polarization supported by each of the one or more antenna subarrays. The UE further receives an indication to operate each of the one or more antenna subarrays with one or more of the at least one polarization and communicates according to the indication.

30 Claims, 11 Drawing Sheets

(51) Int. Cl.
*H04W 72/04* (2009.01)
*H04B 7/0456* (2017.01)

(56) References Cited

U.S. PATENT DOCUMENTS

| | | | | |
|---|---|---|---|---|
| 2008/0150799 | A1* | 6/2008 | Hemmi | H01Q 13/085 |
| | | | | 342/361 |
| 2009/0207093 | A1* | 8/2009 | Anreddy | H04B 7/04 |
| | | | | 343/876 |
| 2009/0224983 | A1* | 9/2009 | Laroia | H01Q 21/24 |
| | | | | 343/702 |
| 2010/0234071 | A1* | 9/2010 | Shabtay | H04B 7/0408 |
| | | | | 455/562.1 |
| 2012/0328031 | A1* | 12/2012 | Pajukoski | H04L 25/03942 |
| | | | | 375/259 |
| 2013/0083757 | A1* | 4/2013 | Kakishima | H04B 7/0417 |
| | | | | 370/329 |
| 2013/0300602 | A1* | 11/2013 | Zhou | H01Q 3/247 |
| | | | | 342/372 |
| 2014/0098689 | A1 | 4/2014 | Lee et al. | |
| 2015/0215793 | A1* | 7/2015 | Siomina | G01S 5/0205 |
| | | | | 455/456.1 |
| 2016/0080052 | A1 | 3/2016 | Li et al. | |
| 2017/0201300 | A1* | 7/2017 | Parkvall | H04B 7/0456 |
| 2017/0245142 | A1* | 8/2017 | Takahashi | H04W 28/04 |
| 2017/0366235 | A1* | 12/2017 | Kim | H04B 7/04 |

* cited by examiner

UE CAPABILITY REPORTING FOR DUAL-POLARIZATION WIRELESS COMMUNICATION

CROSS-REFERENCE TO RELATED APPLICATION(S)

This application claims the benefit of U.S. Provisional Application Ser. No. 62/382,627, entitled "UE CAPABILITY REPORTING FOR DUAL-POLARIZATION MILLIMETER-WAVE COMMUNICATION" and filed on Sep. 1, 2016, which is expressly incorporated by reference herein in its entirety.

BACKGROUND

Field

The present disclosure relates generally to communication systems, and more particularly, to a user equipment (UE) reporting for antenna capability in wireless communication and more specifically in millimeter-wave (mmW) communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In wireless communication, for example in mmW communication, there may be a variety of ways in which UEs can support hybrid beamforming using dynamically configurable analog RF chains and digital antenna ports. The beamforming process may be improved (e.g., performed more efficiently) if the UE communicates to the base station (e.g., the evolved Node B (eNB)) certain capabilities supported by the UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The summary's sole purpose is to present some concepts of one or more aspects in a simplified form as a prelude to the more detailed description that is presented later.

In multiple antenna wireless communication systems, for example in mmW communication systems, UEs may be capable of reusing the same hardware (e.g. RF chains) for spatial diversity (single-layer MIMO) and/or dual-polarization MIMO. For example, some of the antenna elements or antenna subarrays may support one type of polarization, such as horizontal polarization (H-polarization). Others of the antenna elements or antenna subarrays may support a second type of polarization, such as vertical polarization or V-polarization. Some antenna elements may support both horizontal polarization and vertical polarization. In dynamically varying environments, wireless communications, such as the beamforming process, may benefit from the UE reporting the capabilities of the UE (e.g., antenna polarizations) to the eNB. For example, the eNB may take such capabilities into consideration to improve system performance (e.g. higher throughput, more robust connections, etc.).

In some aspects, the UE may support dual polarization (e.g., both H-polarization and V-polarization). Depending on hardware implementation, certain antenna elements or groups of antenna elements (tiles) may be configured to support single polarization while the others may support dual polarization. In addition to polarization capability, the UE may support different modes of carrier aggregation, where certain antenna elements or tiles may be configured to support different component carriers. The UE may report, to the eNB, the combined dimensions of polarization, hybrid beamforming, and multicarrier support.

In an aspect of the disclosure, a method, a computer-readable medium, and an apparatus are provided. The apparatus may be a UE. The UE reports antenna capability information of the UE, the antenna capability information comprising identification information of each of one or more antenna subarrays and polarization information indicating at least one polarization supported by each of the one or more antenna subarrays. The UE further receives an indication to operate each of the one or more antenna subarrays with one or more of the at least one polarization and communicates according to the indication.

In another aspect, the apparatus may be a UE. The UE includes means for reporting antenna capability information of the UE, the antenna capability information comprising identification information of each of one or more antenna subarrays and polarization information indicating at least one polarization supported by each of the one or more antenna subarrays. The UE includes means for receiving an indication to operate each of the one or more antenna subarrays with one or more of the at least one polarization. The UE includes means for communicating according to the indication.

In another aspect, the apparatus may be a UE including a memory and at least one processor coupled to the memory. The at least one processor is configured to: report antenna capability information of the UE, the antenna capability information comprising identification information of each of one or more antenna subarrays and polarization information indicating at least one polarization supported by each of the one or more antenna subarrays, receive an indication to operate each of the one or more antenna subarrays with one or more of the at least one polarization, and communicate according to the indication.

In another aspect, a computer-readable medium storing computer executable code for a UE includes code to: report antenna capability information of the UE, the antenna capability information comprising identification information of each of one or more antenna subarrays and polarization information indicating at least one polarization supported by each of the one or more antenna subarrays, receive an indication to operate each of the one or more antenna subarrays with one or more of the at least one polarization, and communicate according to the indication.

In another aspect of the disclosure, a method, a computer-readable medium, and an apparatus are provided. The apparatus may be a base station. The base station receives, from a UE, antenna capability information of the UE, the antenna capability information comprising identification information of each of one or more antenna subarrays of the UE and polarization information indicating at least one polarization supported by each of the one or more antenna subarrays. The base station further transmits an indication to operate each of the one or more antenna subarrays with one or more of the at least one polarization and communicates according to the indication.

In another aspect, the apparatus may be a base station. The base station includes means for receiving, from a UE, antenna capability information of the UE, the antenna capability information comprising identification information of each of one or more antenna subarrays of the UE and polarization information indicating at least one polarization supported by each of the one or more antenna subarrays. The base station includes means for transmitting an indication to operate each of the one or more antenna subarrays with one or more of the at least one polarization. The base station includes means for communicating according to the indication.

In another aspect, the apparatus may be a base station including a memory and at least one processor coupled to the memory. The at least one processor is configured to: receive, from a UE, antenna capability information of the UE, the antenna capability information comprising identification information of each of one or more antenna subarray and polarization information indicating at least one polarization supported by each of the one or more antenna subarrays, transmit an indication to operate each of the one or more antenna subarrays with one or more of the at least one polarization, and communicate according to the indication.

In another aspect, a computer-readable medium storing computer executable code for a base station includes code to: receive, from a UE, antenna capability information of the UE, the antenna capability information comprising identification information of each of one or more antenna subarray and polarization information indicating at least one polarization supported by each of the one or more antenna subarrays, transmit an indication to operate each of the one or more antenna subarrays with one or more of the at least one polarization, and communicate according to the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
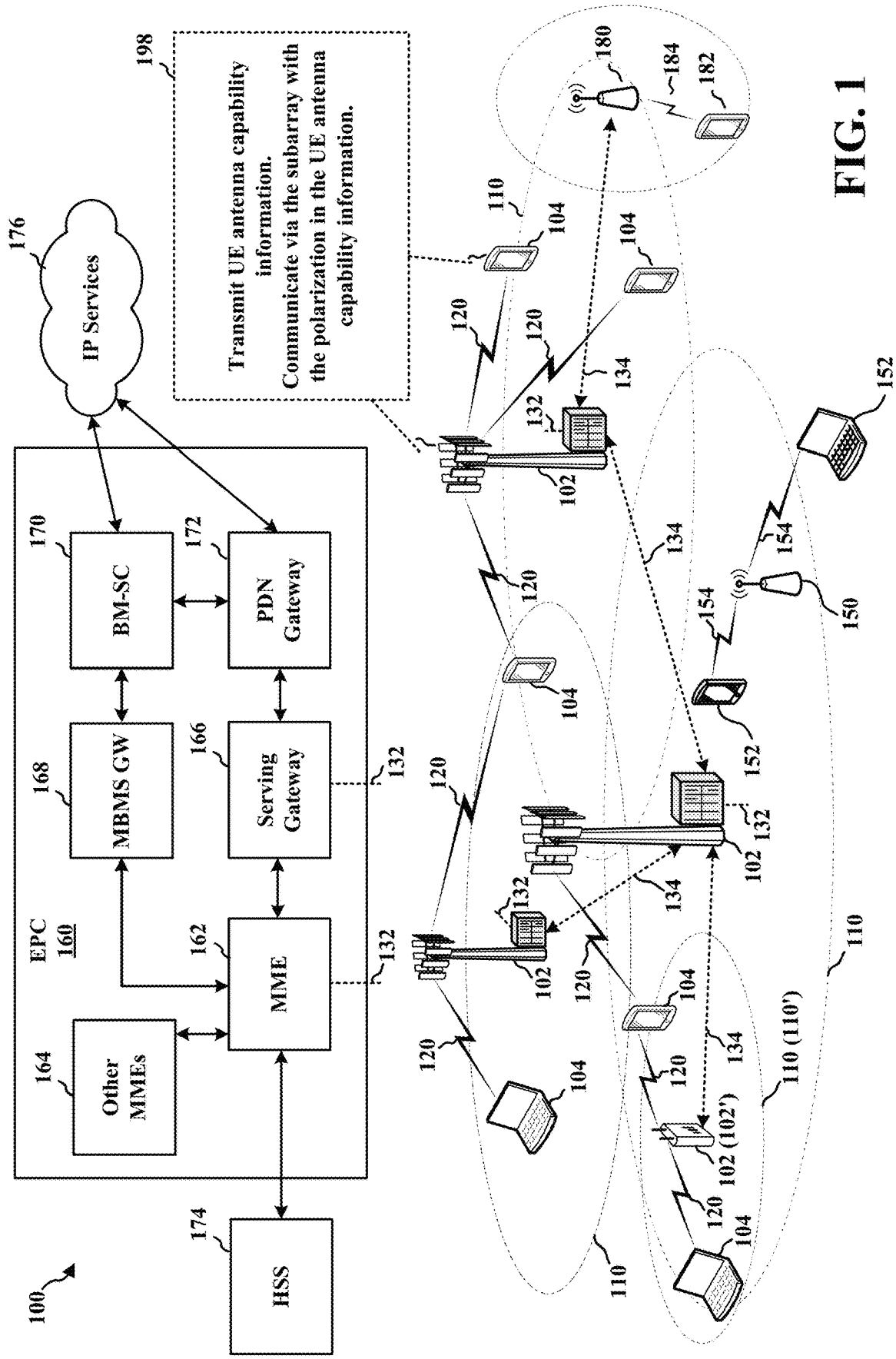
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz, up to 100 MHz per component carrier and 8 component carriers) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a an unlicensed frequency spectrum (e.g. there are existing Wi-Fi bands in 2.4 GHz, 5 GHz, 60 GHz). When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF may have a frequency band of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range. In some example, the mmW communications may support component carriers of 100 MHz and 8 component carriers.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit UE antenna capability information and/or to communicate via the subarray with the polarization in the UE antenna capability information (198).

Figure 2B:
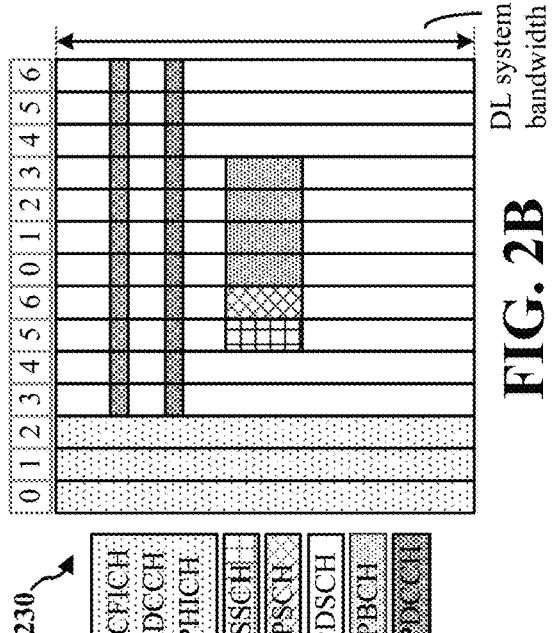
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2D:
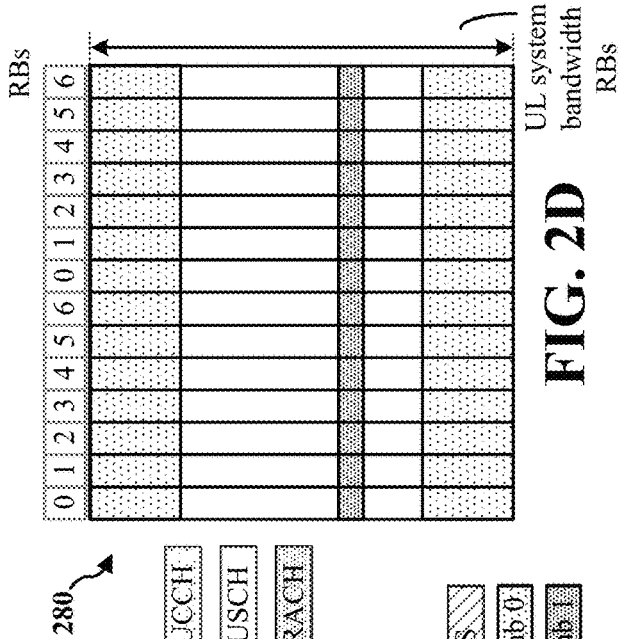
Figure 2A:
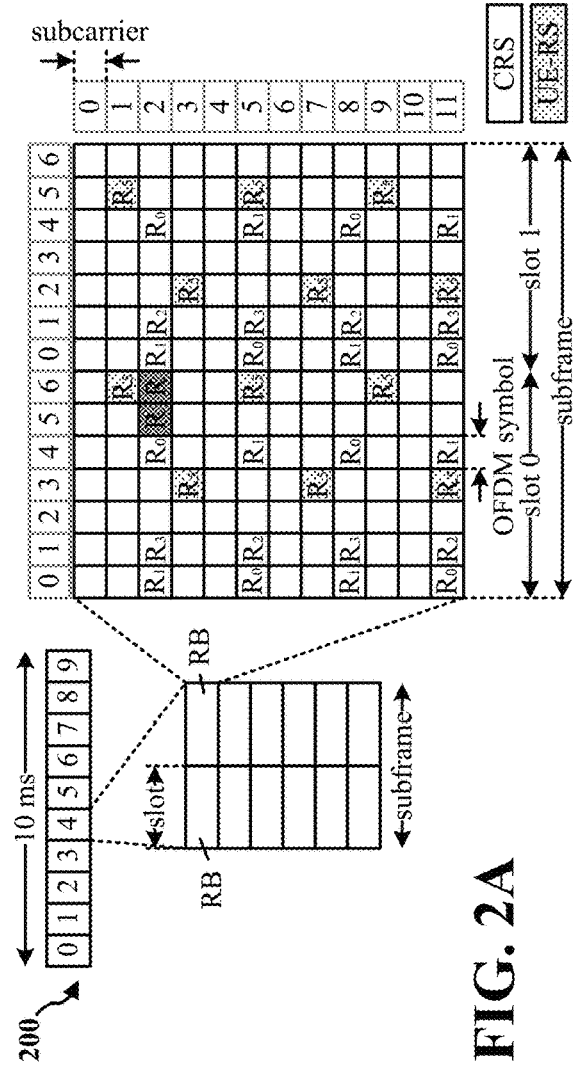
Figure 2C:
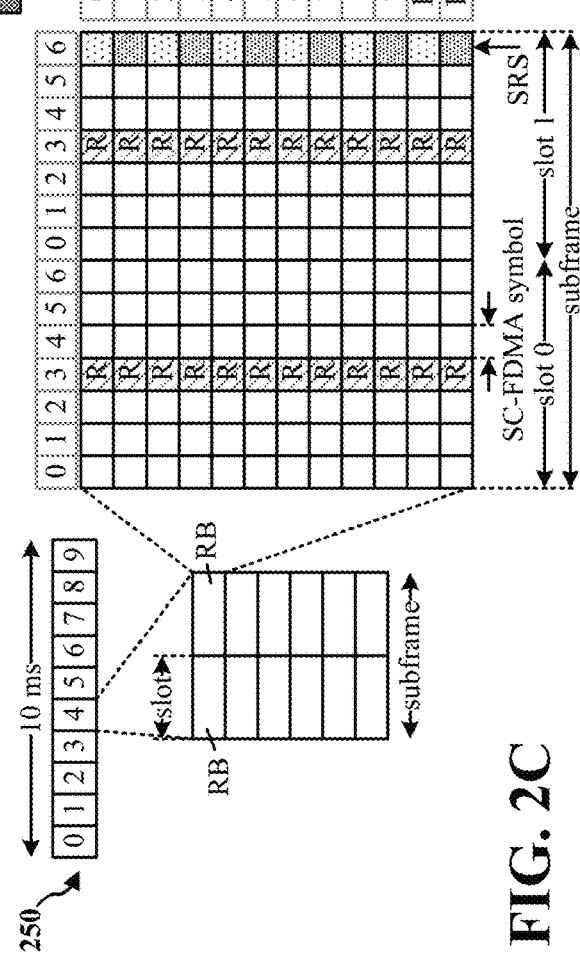

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
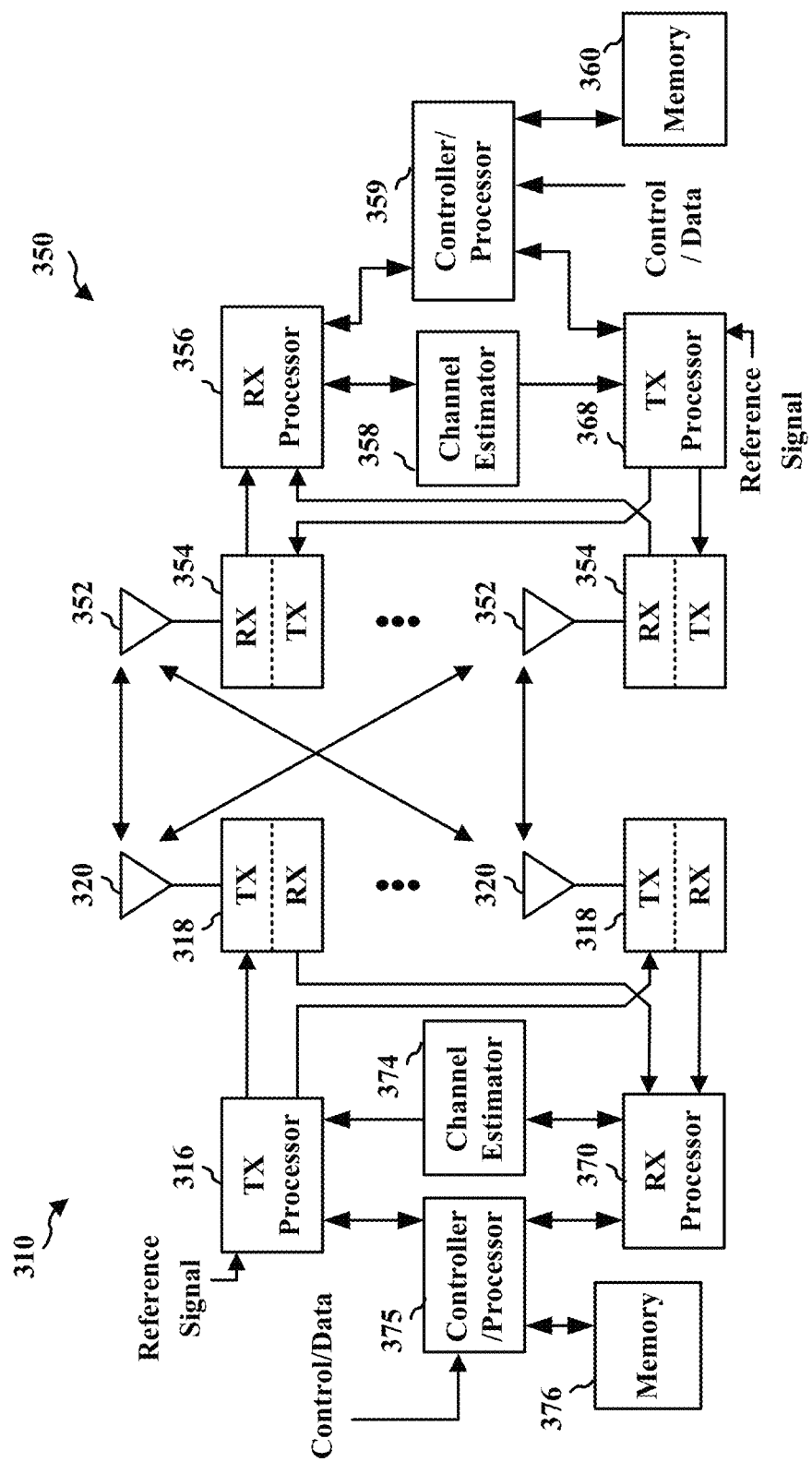
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
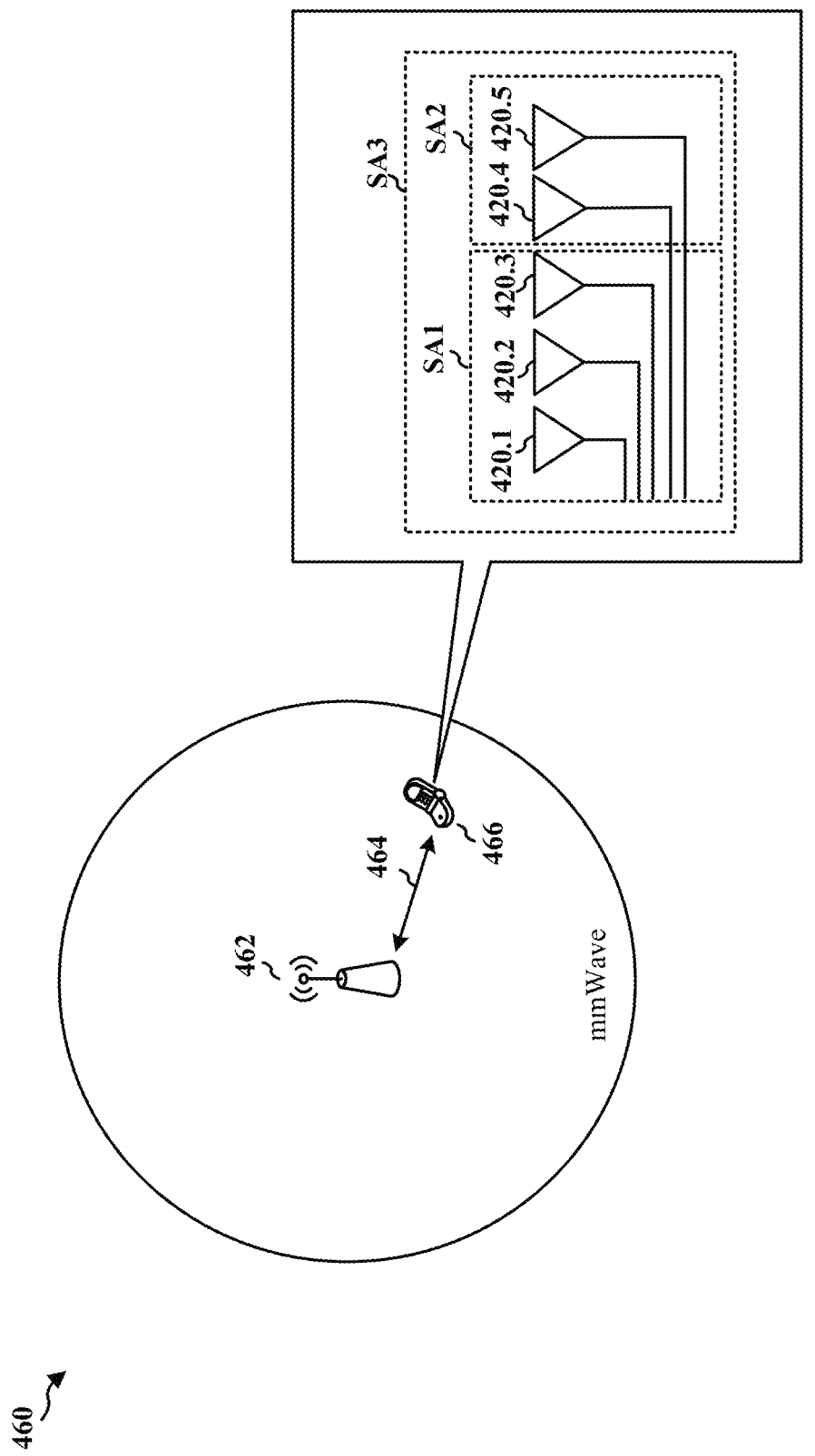
FIG. 4 is a diagram of a communication system for antenna capability reporting in multi-antenna wireless communication such as mmW communication.

FIG. 4 is a diagram of a communication system for antenna capability reporting in multi-antenna communication system such as mmW communication. The communication system 460 may include an eNB 462 and a UE 466. In some examples, the eNB 462 is an example of a mmW base station. The eNB 462 and the UE 466 may include hardware for performing analog, digital, and/or hybrid beamforming (e.g., for mmW communication). The eNB 462 and the UE 466 may communicate via the UL/DL link 464 in, for example, the Uu interface of LTE.

In some examples, the UE 466 may be customer-premise equipment (CPE). Examples of the CPE may include devices such as telephones, routers, switches, residential gateways (RG), set-top boxes, fixed mobile convergence products, home networking adapters, and/or Internet access gateways that enable consumers to access communications service providers' services and/or distribute them around their house via a local area network (LAN).

The millimeter wavelength RF channel may have high path loss and a short range. For example, wireless communications at 60 GHz (mmW communication) may suffer from approximately 28 dB more loss than communications at 2.4 GHz (non-mmW communications). In order to build a useful communication network in the millimeter wavelength spectrum, a beamforming technique may be used to compensate for the high path loss. The beamforming technique may utilizes a large number of antennas to focus the RF energy into a narrow beam in a particular direction to allow the RF beam to propagate farther in the particular direction. Using the beamforming technique, non-line of sight (NLOS) RF communication in the millimeter wavelength spectrum may rely on reflection and/or diffraction of the beams to reach the UE. If the direction of the beam becomes blocked (e.g., due to the UE movement and/or changes in the environment (e.g., obstacles, humidity, rain, etc.)), the beam may not be able to reach the UE. The beamforming technique may require that the mmW base stations and the UEs transmit and receive in a direction that allows the most RF energy to be collected. Accordingly, without knowing the directions for the beamforming, a reliable link between the UEs and the mmW base stations cannot be made. Without a reliable link, UEs cannot discover the millimeter wavelength access network. In particular, without a reliable link, network parameter initialization, secure handshaking processes between the network and the UEs, and network state tracking processes may not be performed.

As part of the beamforming operation, codebooks in the eNB 462 and the UE 466 may be utilized. Due to the high path loss of mmW communications (e.g., due to high carrier frequency on the order of 30-60 GHz), joint Tx/Rx beamforming may be utilized to bring large antenna array gains. As part of the beamforming process, the space for beam search (at the transmitter and receiver side, respectively) may be represented by a codebook containing multiple codewords. The best transmit/receive beams (e.g., transmit/receive beams with the highest signal strength) may found by searching through the respective codebooks.

The codebooks may include different sets of precoding matrices. In some examples, the UE 466 may estimate the channel quality and recommend a precoding matrix to the network as part of the channel state information (CSI) reporting. Thus, the CSI estimation and CSI reporting may be related to various precoding matrices. The different codebooks may be used for different transmission conditions (e.g., different transmission modes). In LTE and fifth generation new radio (5G-NR), an index may be assigned to each precoding matrix, and the index may be used to communicate between network and the UE 466 regarding the specific precoding matrix or codebook to be used.

Since there may be many different sets of matrices and the network may consume network resources (e.g., bandwidth) to convey the values of matrices, a more efficient way to indicate each matrix is desirable. In an aspect, for LTE, a number (index) may be assigned to each precoding matrix and that index number may be utilized to communicate between the network and the UE about a specific precoding matrix. For the UL transmission (and associated DL reciprocity), there may be a need for an antenna port numbering scheme. In one approach, the antenna port numbering scheme may be a beam pair {subarray index, antenna index}. Then, the selection and corresponding configured parameters may refer to the subarray index.

The UE 466 may include antenna elements 420.1-420.5 arranged in one or more antenna subarrays. In some examples, each antenna subarray may be coupled to a transceiver (e.g., an instance of the transceiver 318). In the communication system 460, the UE 466 includes the antenna subarray SA1, which includes the antenna elements 420.1-420.3. The UE 466 further includes the antenna subarray SA2, which includes the antenna elements 420.4 and 420.5. The antenna elements of antenna subarray SA1 and the antenna subarray SA2 grouped together may be considered as another antenna subarray SA3.

Figure 5:
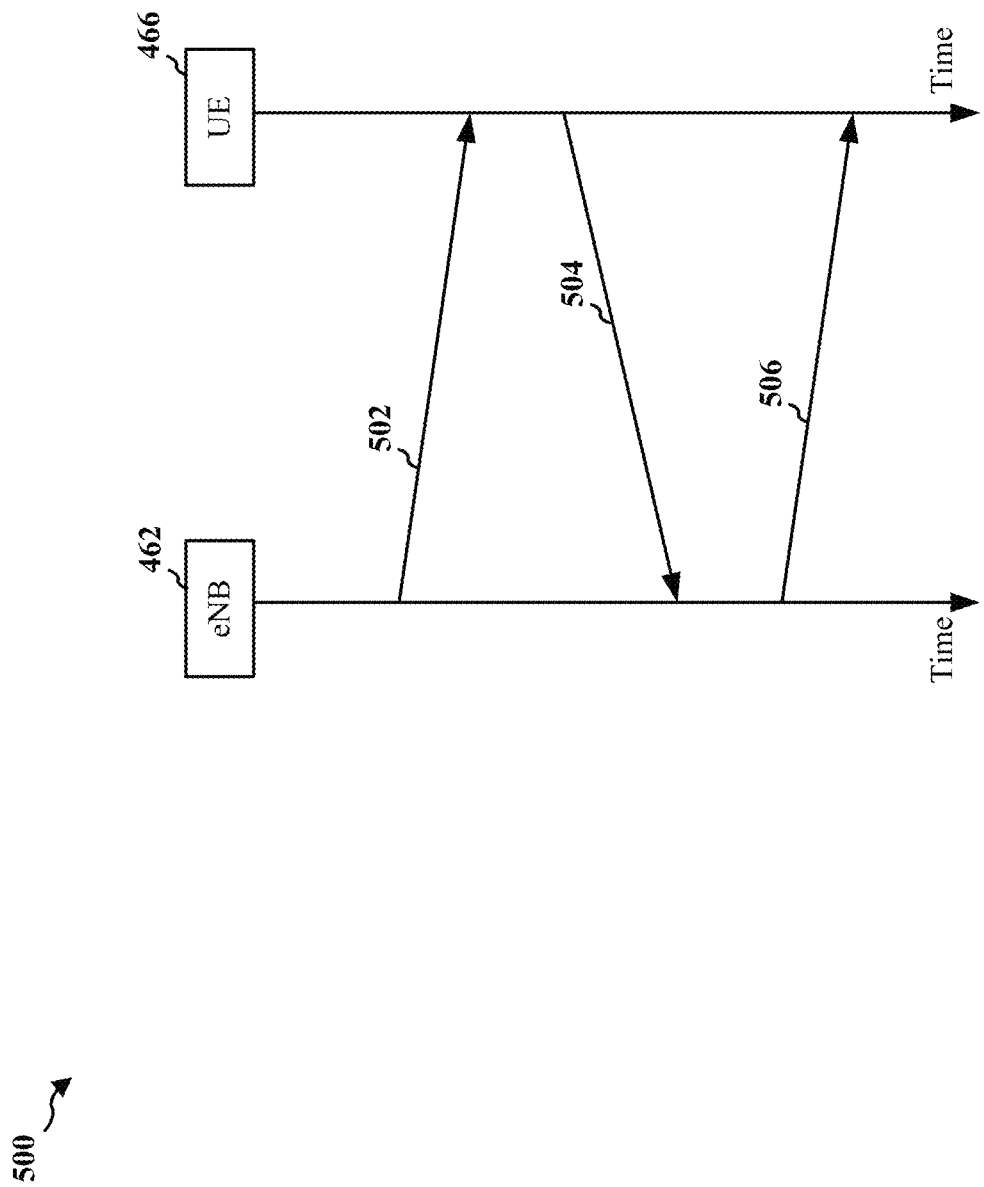
FIG. 5 is a diagram of signaling between the eNB and the UE in the communication system of FIG. 4 for antenna capability reporting.

FIG. 5 is a diagram of signaling between a eNB and a UE in the communication system of FIG. 4 for antenna capability reporting, according to an aspect of the disclosure. The diagram 500 includes the eNB 462 communicating with the UE 466 regarding the reporting of the UE antenna capability information. The eNB 462 may transmit an inquiry 502 to the UE 466. In response to the inquiry 502, the UE 466 may report to the eNB 462 the UE antenna capability information 504. Based on the received UE antenna capability information 504, the eNB 462 may determine, for example, various restrictions on operating each antenna subarray of the UE 466 (e.g., SA1, SA2, SA3) with vertical and/or horizontal polarization of the UE 466. The eNB 462 may transmit to the UE 466 an indication (e.g., the various restrictions) 506 on operating each antenna subarray with the selected polarization(s). Subsequently, the eNB 462 and the UE 466 may communicate according to the indication 506 on operating each antenna subarray.

According to an aspect of the disclosure, the eNB 462 may transmit the inquiry 502 to the UE 466 as part of a procedure for establishing the RRC connection. For example, the UE 466 may be in an RRC_IDLE state when the inquiry 502 is transmitted. In one example, the inquiry 502 may be a part of the RRC connection setup message from the eNB 462 to the UE 466 to establish the RRC connection. The UE antenna capability information 504 reported by UE 466 to the eNB 462 may be part of a RRC connection setup completion message.

In one aspect, in the RRC_CONNECTED state, the eNB 462 may transmit the inquiry 502 to the UE 466. For example, the eNB 462 may transmit the inquiry 502 using the UECapabilityEnquiry message as the inquiry. In an aspect, the eNB 462 may request the UE antenna capability information 504 implicitly via the inquiry 502. For example, the inquiry 502 may be a general inquiry and may not specifically request the antenna subarray and/or the polarization supported by the antenna subarray. In response to the general inquiry, each UE that supports mmW communication may report UE antenna capability information. Thus, in some examples, all UEs (e.g., including the UE 466) supporting the mmW frequencies may report the UE antenna capability information 504 including information on whether dual polarization is supported, in response to the inquiry 502. The UE antenna capability information 504 may further information on whether single polarization is supported. When the UE 466 receives the general inquiry, the UE 466 may report, to the eNB 462, the UE antenna capability information in response to the general inquiry. For example, the inquiry may be an inquiry for carrier aggregation information. In another aspect, the eNB 462 may request the UE antenna capability information 504 explicitly via the inquiry 502. In particular, the inquiry 502 transmitted by the eNB 462 may be a specific inquiry that explicitly indicates a request for the UE antenna capability information. For example, the eNB 462 may transmit inquiry 502 to explicitly indicate a request for the UE antenna capability information 504 (e.g., about whether the UE 466 supports dual polarization) using a specific container field in an RRC message. For example, the inquiry 502 may specifically indicate a request for UE capabilities (e.g., polarization(s) supported by the subarray(s)) of the UE 466 in addition to the capabilities of the UE 466 provided to establish the RRC connection.

According to an aspect of the disclosure, in response to the inquiry 502 from the eNB 462, the UE 466 may report to the eNB 462 the beamforming capabilities (e.g., the UE antenna capability information including polarizations supported by each antenna subarray) supported by the UE 466 using a message for carrying UE capability information. For example, reporting the beamforming capabilities may be a part of an initial setup procedure to establish an RRC connection. For example, the UE 466 may report the beamforming capabilities using a UECapabilityInformation message (e.g., an RCC message). In some examples, the UE 466 may use a new field in the RRC signaling (e.g., in an RRC message) (e.g., not previously defined or provided) to report dual polarization capability in the UECapabilityInformation message (e.g. the new field may be named dualpolarizationreport).

In one aspect, the UE 466 may report to the eNB 462 the UE antenna capability information 504, including the antenna configuration (e.g., such as antenna subarray configurations) of the UE 466, possible combinations of polarization across different subarrays, and/or types of polarization for each subarray. In some examples, the UE antenna capability information 504 may further include identifiers for antenna subarray configurations (e.g., SA1, SA2, SA3). For example, the antenna subarray configurations may depend on how antenna elements are grouped together to form different subarrays.

The UE antenna capability information 504 may further specify certain antenna subarray configurations which support dual polarization capability. The UE antenna capability information 504 may further specify subarray configurations which support single polarization capability. In one example, the UE antenna capability information 504 may indicate that a first antenna subarray identifier (e.g., identifying SA1) supports the H-polarization and that a second antenna subarray identifier (e.g., identifying SA2) supports the V-polarization. In another example, the UE antenna capability information 504 may further specify subarray(s) that may simultaneously support H-polarization and H-polarization or simultaneously support H-polarization and V-polarization. In some examples, the UE 466 may change the aforementioned subarray configurations dynamically and report the changed configurations to the eNB 462, as communication conditions change. For example, the UE 466 may be mobile and thus may move from one location to another location, resulting in changes in the communication conditions (e.g., detected by the UE 466 as part of the periodic beam training). Thus, the UE 466 may update the subarray configurations based on the changes in the communication conditions, and may report to the eNB 462 the updated subarray configurations. In some aspects, the UE 466 may report multicarrier configuration information in combination with information on the polarization configuration information (e.g., dual polarization capability).

According to an aspect of the disclosure, the eNB 462 may use the UE antenna capability information 504 in making beamforming decisions which may improve data throughput and/or communication robustness. For example, the eNB 462 may determine operations for an antenna subarray and the polarization supported based on the information listed in the UE antenna capability information 504. For example, the eNB 462 and the UE 466 may determine two beam pairs, beam pair 1=(Tx_beam_H, Rx_beam_H) and beam pair 2=(Tx_beam_V, Rx_beam_V) to improve throughput and/or robustness, based on the information provided in the UE antenna capability information 504. The beam pairs may be updated dynamically based on changing communication conditions and/or changes in the UE antenna capability information 504.

Table 1 provides an example of a list of available polarization mode(s) for each subarray identified by a subarray identification.

TABLE 1

| Subarray Identification | Available Polarization Modes |
|---|---|
| SA1 | H-polarization |
| | V-polarization |
| | Both H-polarization and V-polarization |
| SA2 | H-polarization |
| | V-polarization |
| | Both H-polarization and V-polarization |
| SA3 (SA1 and SA2) | H-polarization |
| | V-polarization |
| | Both H-polarization and V-polarization |

Referring to FIG. 4, the UE 466 may include two antenna subarrays denoted by SA1 and SA2, each of which may include an arbitrary number of antenna elements 420 that are grouped together by the choice of implementation. The antenna subarrays SA1 and SA2 may be grouped together to form a third subarray, denoted by SA3.

In an example, the UE 466 may report the UE antenna capability information 504 in the UECapabilityInformation message. The UE antenna capability information 504 may include a number of supported subarrays, subarray identifiers corresponding to respective supported subarrays, and a supported polarization mode for each subarray identifier. For example, each of the subarrays may support one or more of a first polarization mode supporting V-polarization only, a second polarization mode that supports the H-polarization mode only, or a third polarization mode that supports both V-polarization and H-polarization. For example, the UE antenna capability information 504 may include:

Number of subarrays supported=3

Subarray ID: {SA1, SA2, SA3}

For each subarray ID, supported polarization mode(s) (e.g., from the options listed in Table 1). The supported polarization mode(s) may be a subset of all possible options listed in Table 1. For example, a subarray may support V-polarization, or H-polarization, or both V-polarization and H-polarization.

In according to an aspect of the disclosure, the eNB 462 may configure codebook restrictions for channel state feedback, based on the UE antenna capability information 504. For example, the eNB 462 may select a codebook restriction (e.g., in terms of throughput and/or robustness), based on the received UE antenna capability information 504. A codebook may contain a set of precoding matrices that define eNB antenna coefficient weights. Based on the DL reference signals such as a CRS or a CSI-RS, the UE 466 may identify a precoder from a given codebook (i.e., precoder that defines set of eNB antenna coefficient weights) to improve the signal quality and consequently the data throughput. In some examples, the codebook restriction may be subarray specific. For example, the codebook restriction may provide that a particular subarray may support H polarization for Rank 1 transmission. Thus, the codebook restriction may provide a specific subarray polarization and the corresponding transmission rank or ranks.

For example, the UE 466 may report to the eNB 462 that the subarray SA1 supports H-polarization (e.g., via the UE antenna capability information 504). Therefore, the precoders that are permissible for SA1 may be for rank-1 transmission only. From the eNB 462 point of view, the overall set of precoders for a subarray similar to the subarray SA1 may include several precoders that are for rank-2 transmission, but for this particular UE (e.g., UE 466), only a subset of all such precoders may be used for the subarray SA1. For example, the precoders that correspond to rank-1 transmission using H-polarization may be used by the UE 466. When the UE 466 reports CSI for the subarray SA1 to the eNB 462, the eNB 462 may determine and restrict the codebook for the subarray SA1 to the restricted subset of precoders (e.g., Rank 1) based on the reported CSI. The eNB 462 may provide the codebook restriction as the indication 506 to operate the antenna subarray (e.g., the subarray SA1) with the at least one polarization. The precoding codebook configuration and the corresponding feedback signaling provided to the eNB 462 by the UE 466 may improve performance of DL MIMO.

In one aspect, the eNB 462 may transmit, for example, the beam pairs and the codebook restrictions to the UE 466 as an indication 506 to operate the antenna subarray with the at least one polarization. Thus, in some examples, the indication 506 may include one or more beam pairs. In some examples, the indication 506 may include the codebook restrictions for channel state feedback. The beam pairing may be useful for increasing the link budget between the UE 466 and the eNB 462. The codebook restrictions may be useful for the UE 466 to form beams with specific subarrays (e.g., the subarray SA 1).

In one aspect, the UE 466 may communicate (e.g., with the eNB 462) in accordance with the indication received from the eNB 462. In some examples, the UE antenna capability information 504 may further include multicarrier dimensionality (for example, in conjunction with the polarization supported). In some examples, the UE antenna capability information 504 may provide that different beams and/or different subarrays may use different component carriers. For example, the subarray SA1 may support H-polarization only with component carrier 1, and the subarray SA2 may support V-polarization only with component carrier 2. When the subarray SA3 is used, this subarray SA3 may support both H-polarization with component carrier 1 and V-polarization with component carrier 2.

In some examples, the reporting of dual polarization capability for different UE subarrays may help with efficient utilization of network resources. For example, the UE 466 may support only single polarization (e.g., H-polarization) and rank-1 MIMO transmission using the antenna subarray SA1. In such an example, through the signaling mechanism described above, the UE 466 may report the restriction (e.g., H-polarization with rank-1 MIMO transmission on the antenna subarray SA1) as a part of the UE antenna capability information 504. The eNB 462 may then use the UE antenna capability information 504 to configure (e.g., via an RRC signaling) the UE 466 for specific precoding matrix sets (e.g., codebooks) that have the restriction of H-polarization with rank-1 MIMO transmission on the antenna subarray SA1.

As presented above, the UE 466 may report the UE antenna capability information 504 to the eNB 462. The UE antenna capability information 504 may include identification information (e.g., SA1, SA2, SA3) of one or more antenna subarrays and polarization information indicating at least one polarization (e.g., H-polarization, V-polarization, or both) supported by each of the antenna subarray. The UE antenna capability information 504 may further include polarization information indicating whether the antenna subarray supports dual polarization (e.g., both H-polarization and V-polarization). The UE antenna capability information 504 may indicate combinations of polarization across different antenna subarrays. For example, the subarray SA1 may supports H-polarization only, and the subarray SA2 may support V-polarization only. If the bigger subarray SA3 is used, then the subarray SA3 may support both H-polarization and V-polarization via different component subarrays (while the antenna elements in the subarray SA1 still supports only H-polarization, and the antenna elements in the subarray SA2 still support only V-polarization).

The UE 466 may report the UE antenna capability information 504 to the eNB 462 in response to an inquiry 502 from the eNB 462. In some examples, the inquiry 502 and/or the reporting may be part of an initial setup procedure to establish an RRC connection. For example, the inquiry and reporting may be transmitted in an idle mode (e.g., in RRC_IDLE mode rather than in a connected mode; not in the RRC_CONNECTED state). In some examples, the inquiry 502 and the reporting are transmitted in the RRC_CONNECTED state. In some examples, the inquiry 502 may be a general inquiry (e.g., the inquiry does not specifically request the UE antenna capability information). In some examples, the inquiry 502 may be a specific inquiry (e.g., requesting for information of polarization supported by the UE 466).

The eNB 462 may determine operations (e.g., certain usage or restriction of use) for the antenna subarray and the supported polarization, which may be listed in the UE antenna capability information 504. Such operations may include, for example, identifying beam pairs and/or codebook restrictions. The eNB 462 may transmit to the UE 466 an indication 506 to operate the antenna subarray with the at least one polarization (e.g., certain usage or restriction of use of the antenna subarray with the at least one polarization). The indication 506 may include one or more codebook restrictions for a polarization of the antenna subarray in the UE 466. The indication 506 may include a restriction on the transmission rank, e.g., Rank 1, of the antenna subarray in the UE 466. In some examples, the indication 506 may include pairing information of the antenna subarray of the UE 466 with the at least one polarization and an antenna of an eNB 462 with a particular polarization (e.g., (Tx_beam_H, Rx_beam_H) and (Tx_beam_V, Rx_beam_V)).

The eNB 462 and the UE 466 may, for example, communicate in accordance with the indication 506 as part of the beamforming process. For example, the eNB 462 and the UE 466 may perform a beamforming training procedure and based on the results, select an appropriate beam pair. The eNB 462 may send beam reference signals (BRS), and the UEs (e.g., UE 466) may measure the BRS to determine the most appropriate beam pairs (e.g., beam pairs that provide the highest signal strength). The eNB 462 and the UE 466 may also use periodic beam training to refine the beams using the Beam Refinement Reference Signal (BRRS). The UE 466 may communicate in accordance with the indication 506, including reporting channel state feedback (e.g., as provided by the codebook restrictions from the eNB 462). For example, the restrictions may include permissible precoders based on which polarization modes are supported in the different subarrays, as reported by the UE 466. The restrictions may allow the UE 466 to report CSI on a subset of the full set of codebooks that would be defined for dual-polarization capability.

Figure 6:
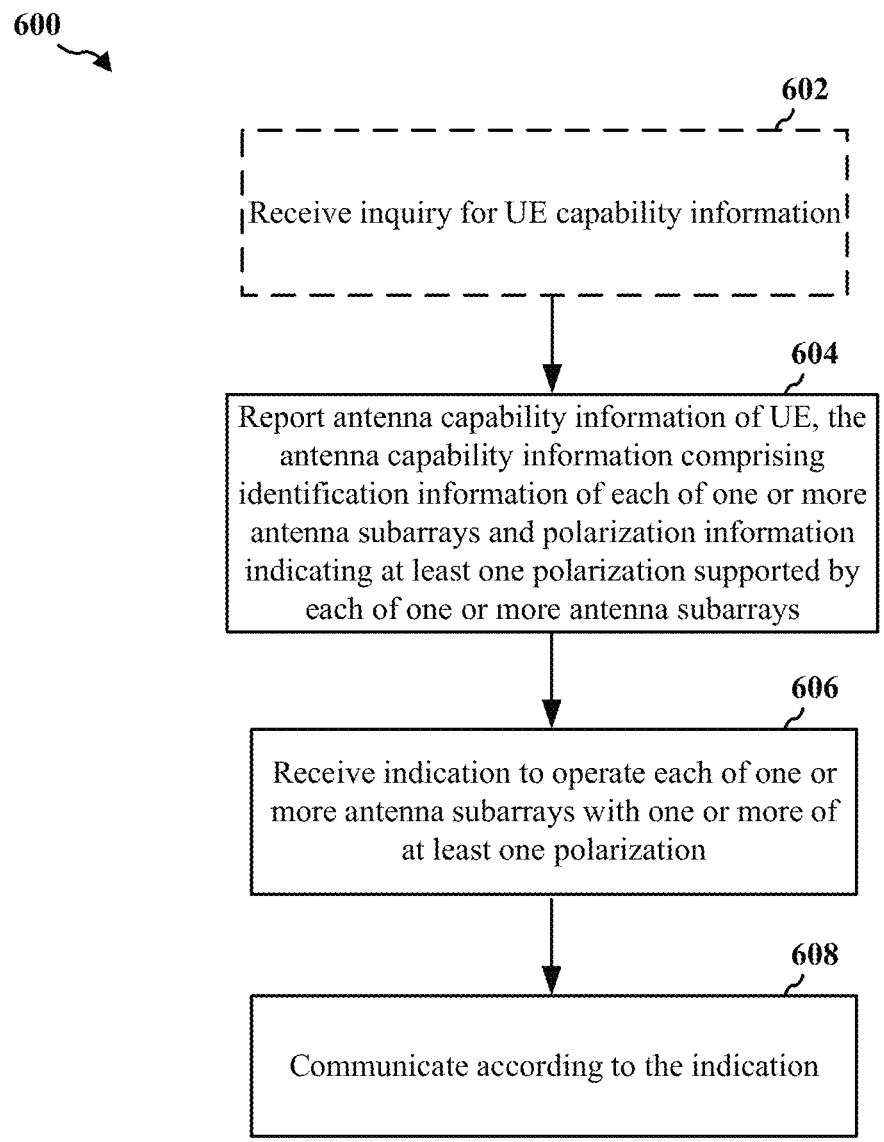
FIG. 6 is a flowchart of a method of wireless communication.

FIG. 6 is a flowchart 600 of a method of wireless communication. The method may be performed by a UE (e.g., the UE 466 as presented with FIGS. 4 and 5; the apparatus 702/702'). At 602, the UE may receive, from a base station, an inquiry for UE capability information. For example, as discussed supra, the eNB 462 may transmit the inquiry 502 to the UE 466. In an aspect, the inquiry is received in an RRC connected state. For example, as discussed supra, in the RRC_CONNECTED state, the eNB 462 may transmit the inquiry 502 to the UE 466. In an aspect, the inquiry may include a request for information of polarization supported by the UE. For example, as discussed supra, the eNB 462 may request the UE antenna capability information 504 implicitly via the inquiry 502. For example, as discussed supra, the eNB 462 may request the UE antenna capability information 504 explicitly via the inquiry 502.

At 604, the UE reports antenna capability information of the UE, the antenna capability information including identification information of each of one or more antenna subarrays and polarization information indicating at least one polarization supported by each of the one or more antenna subarrays. For example, referring back to FIG. 5, the UE 466 may report to the eNB 462 the UE antenna capability information 504, including the antenna configuration of the UE 466, possible combinations of polarization across different subarrays, and/or types of polarization for a specific subarray. In some examples, the UE antenna capability information 504 may further include identifiers for antenna subarray configurations (e.g., SA1, SA2, SA3). The eNB 462 may communicate the codebook restrictions to the UE 466 via RRC signaling, for example. In an aspect, the antenna capability information may be reported in response to the inquiry from the base station. For example, as discussed supra, in response to the inquiry 502, the UE 466 may report to the eNB 462 the UE antenna capability information 504. In an aspect, the reporting the antenna capability information may be part of initial setup procedure to establish an RRC connection with a base station. For example, as discussed supra, reporting the beamforming capabilities (e.g., UE antenna capability information) may be a part of an initial setup procedure to establish an RRC connection.

In an aspect, the polarization information indicating the at least one polarization supported by each of the one or more antenna subarrays may indicates at least one of single polarization or dual polarization supported by each of the one or more antenna subarrays. For example, as discussed supra, the UE antenna capability information 504 may further specify certain antenna subarray configurations which support dual polarization capability, and may also specify subarray configurations which support single polarization capability. In an aspect, the dual polarization supported by each of the one or more antenna subarrays may include V-polarization, H-polarization, or both V-polarization and H-polarization. In an aspect, the polarization information indicating the at least one polarization supported by each of the one or more antenna subarrays may include combinations of polarization across different antenna subarrays, including the one or more antenna subarrays. For example, as discussed supra, the UE antenna capability information 504, including the antenna configuration of the UE 466, may include possible combinations of polarization across different subarrays, and/or types of polarization for a specific subarray.

At 606, the UE receives an indication to operate each of the one or more antenna subarrays with one or more of the at least one polarization. In some examples, the indication 506 may include one or more beam pairs. In some examples, the indication 506 may include a codebook restriction for channel state feedback. Finally, at 608, the UE 466 communicates according to the indication. In an aspect, the communicating according to the indication may be part of beamforming. For example, as discussed supra, the eNB 462 and the UE 466 may, for example, communicate in accordance with the indication 506 as part of the beamforming process.

In an aspect, the indication may include a codebook restriction of polarization for each of the one or more antenna subarrays. In an aspect, the indication may further include a restriction on a transmission rank for each of the one or more antenna subarrays. In an aspect, the communicating according to the indication may include reporting channel state information. For example, as discussed supra, the UE 466 may communicate in accordance with the indication 506, including reporting channel state feedback (e.g., as provided by the codebook restrictions from the eNB 462). For example, as discussed supra, the UE 466 may report CSI information on the restricted set of codebooks, and use only a subset of the full set of codebooks for communication. In an aspect, the indication may include pairing information of each of the one or more antenna subarrays with the at least one polarization and an antenna of a base station with a polarization of the antenna of the base station. For example, as discussed supra, the indication 506 may include pairing information of the antenna subarray of the UE 466 with the at least one polarization and an antenna of an eNB 462 with a particular polarization.

Figure 7:
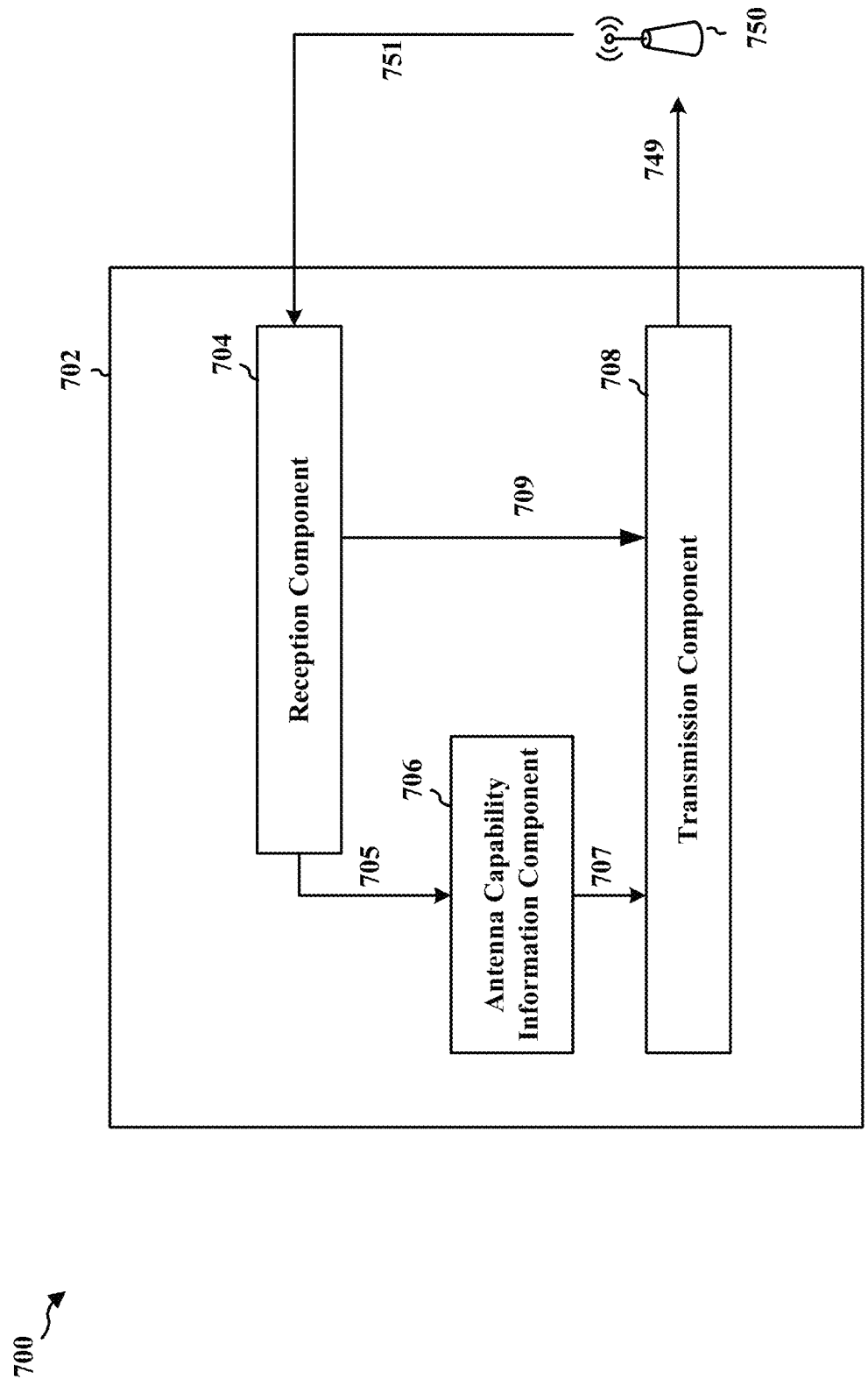
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE. The apparatus includes a reception component 704 that receives signaling from the eNB 750. The signaling 751 may include the inquiry 502 and an indication 506. The antenna capability information component 706 provides the UE antenna capability information 504. The inquiry 502 may be provided to the antenna capability information component 706 via signaling 705. The UE antenna capability information 504 may include antenna configuration, possible combinations of polarization across different subarrays, and type of polarization for a specific subarray. The UE antenna capability information 504 may be provided to the transmission component 708 via the signaling 707. The reception component 704 may provide the received indication 506 to operate the antenna subarray with the at least one polarization to the transmission component 708 via signaling 709. The transmission component 708 transmits signaling 749 to the eNB 750 via the signaling 749. The signaling 749 may include the UE antenna capability information 504 being reported to the eNB 750 and communication in accordance with the indication 506.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
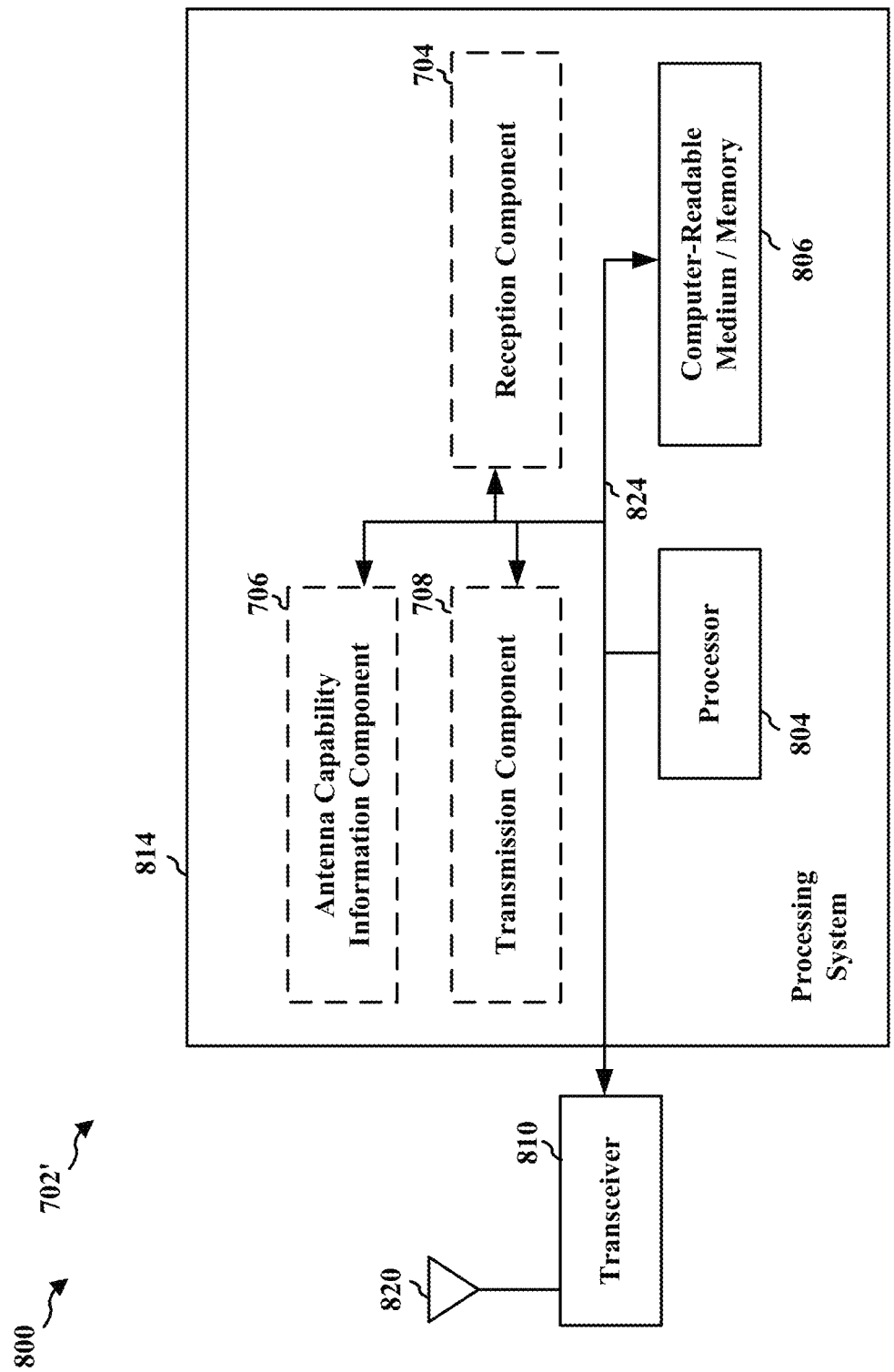
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 708, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for reporting antenna capability information of the apparatus 702/702', the antenna capability information comprising identification information of each of one or more antenna subarrays and polarization information indicating at least one polarization supported by each of the one or more antenna subarrays; means for receiving an indication to operate each of the one or more antenna subarrays with one or more of the at least one polarization; and means for communicating according to the indication. In an aspect, the apparatus 702/702' may further include means for receiving an inquiry for UE capability information (e.g., from a base station), where the antenna capability information is reported in response to the inquiry from the base station. In an aspect, the means for communicating according to the indication may be configured to report channel state information. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
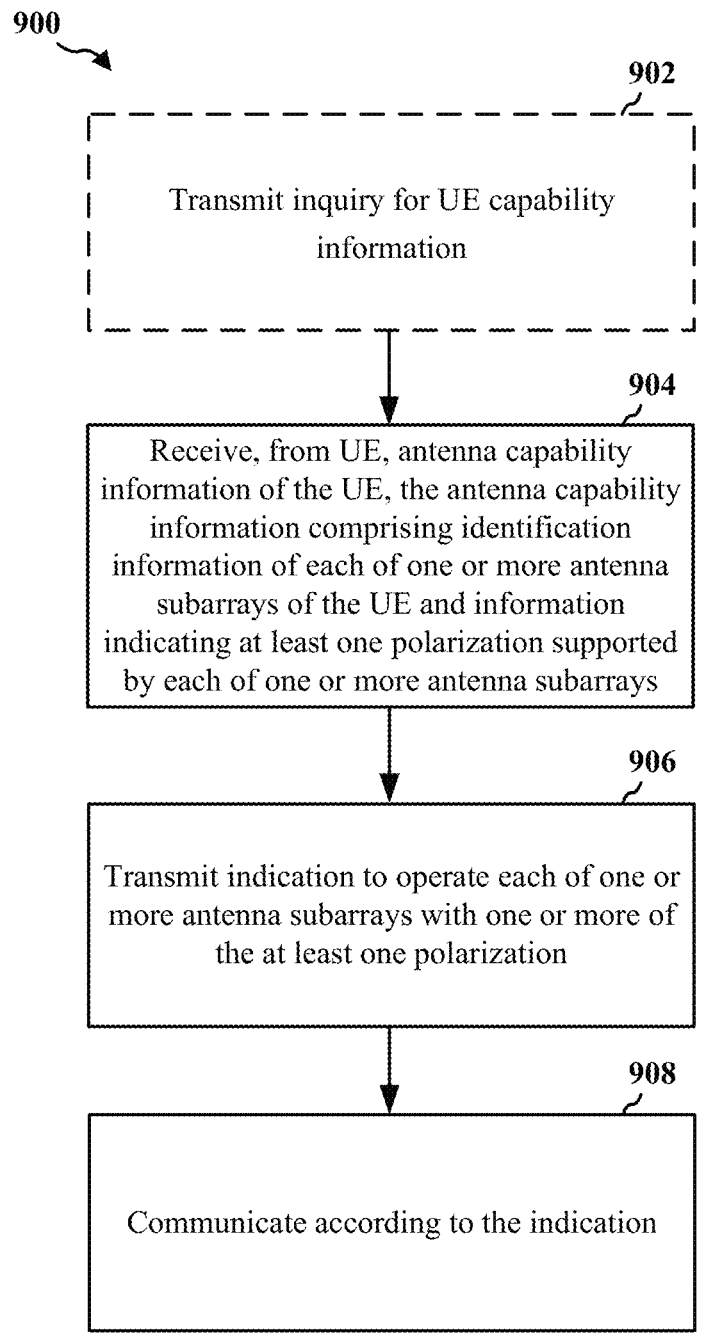
FIG. 9 is a flowchart of another method of wireless communication.

FIG. 9 is a flowchart 900 of a method of wireless communication. The method may be performed by an eNB (e.g., the eNB 462, the apparatus 1002/1002'). Examples of the method are provided with FIGS. 4 and 5. At 902, the base station may transmit an inquiry for UE capability information. For example, as discussed supra, the eNB 462 may transmit the inquiry 502 to the UE 466. In an aspect, the inquiry may be transmitted in an RRC connected state. For example, as discussed supra, in the RRC_CONNECTED state, the eNB 462 may transmit the inquiry 502 to the UE 466. In an aspect, the inquiry may include a request for information of polarization supported by the UE. For example, as discussed supra, the eNB 462 may request the UE antenna capability information 504 implicitly via the inquiry 502. For example, as discussed supra, the eNB 462 may request the UE antenna capability information 504 explicitly via the inquiry 502.

At 904, the base station receives, from a user equipment (UE), antenna capability information of the UE, the antenna capability information comprising identification information of each of one or more antenna subarrays of the UE and polarization information indicating at least one polarization supported by each of the one or more antenna subarrays. At 906, the base station transmits an indication to operate each of the one or more antenna subarrays with one or more of the at least one polarization. For example, the UE 466 reports to the eNB 462 that the subarray SA1 supports only H-polarization (e.g., via the UE antenna capability information 504). Therefore, the precoders that are permissible for SA1 may be for rank-1 transmission only. From the eNB 462 point of view, the overall set of precoders for a subarray similar to the subarray SA1 may include several precoders that are for rank-2 transmission, but for this particular UE (e.g., UE 466), only a subset of all such precoders will be permissible. For example, only the precoders that correspond to rank-1 transmission using H-polarization may be used by the UE 466 for subarray SA1. When the UE 466 reports CSI for the subarray SA1 to the eNB 462, the eNB 462 may determine and restrict the codebook for the subarray SA1 to the restricted subset of precoders (e.g., Rank 1). The eNB 462 may provide the codebook restriction as the indication 506 to operate the antenna subarray (e.g., the subarray SA1) with the at least one polarization. The precoding codebook configuration and the corresponding feedback signaling provided to the eNB 462 by the UE 466 may improve performance of DL MIMO. In an aspect, the antenna capability information may be received in response to the inquiry from the base station. For example, as discussed supra, in response to the inquiry 502, the UE 466 may report to the eNB 462 the UE antenna capability information 504. In an aspect, the receiving the antenna capability information is part of initial setup procedure to establish a radio resource control (RRC) connection with the UE. For example, as discussed supra, reporting the beamforming capabilities (e.g., UE antenna capability information) may be a part of an initial setup procedure to establish an RRC connection.

In an aspect, the polarization information indicating the at least one polarization supported by each of the one or more antenna subarrays may indicates at least one of single polarization or dual polarization supported by each of the one or more antenna subarrays. For example, as discussed supra, the UE antenna capability information 504 may further specify certain antenna subarray configurations which support dual polarization capability. In an aspect, the dual polarization supported by each of the one or more antenna subarrays may include V-polarization, H-polarization, or both V-polarization and H-polarization. In an aspect, the polarization information indicating the at least one polarization supported by each of the one or more antenna subarrays may include a combination of polarization across different antenna subarrays, including each of the one or more antenna subarrays. For example, as discussed supra, the UE antenna capability information 504, including the antenna configuration of the UE 466, may include possible combinations of polarization across different subarrays, and/or types of polarization for a specific subarray.

Finally, at 908, the base station communicates (e.g., with the UE) in accordance with the indication. In an aspect, the communicating according to the indication is part of beamforming. For example, as discussed supra, the eNB 462 and the UE 466 may, for example, communicate in accordance with the indication 506 as part of the beamforming process.

In an aspect, the indication may include codebook restriction of polarization for each of the one or more antenna subarrays in the UE. In an aspect, the indication may further include a restriction of a transmission rank for each of the one or more antenna subarrays in the UE. In an aspect, the communicating according to the indication may include receiving channel state information. For example, as discussed supra, the UE 466 may communicate in accordance with the indication 506, including reporting channel state feedback (e.g., as provided by the codebook restrictions from the eNB 462). For example, the restrictions may be permissible precoders based on which polarization modes are supported in the different subarrays, as reported by the UE 466. For example, as discussed supra, the restrictions may allow the UE 466 to report CSI on a subset of the full set of codebooks that would be defined for dual-polarization capability. In an aspect, the indication may include pairing information of the each of the one or more antenna subarrays with the at least one polarization and an antenna of the base station and polarization with the antenna of the base station. For example, as discussed supra, the eNB 462 and the UE 466 may perform a beamforming training procedure and based on the results, select an appropriate beam pair. For example, as discussed supra, the eNB 462 may send BRS, and the UEs (e.g., UE 466) may measure the BRS to determine the most appropriate beam pairs. The eNB 462 and the UE 466 may also use periodic beam training to refine the beams using the BRRS.

Figure 10:
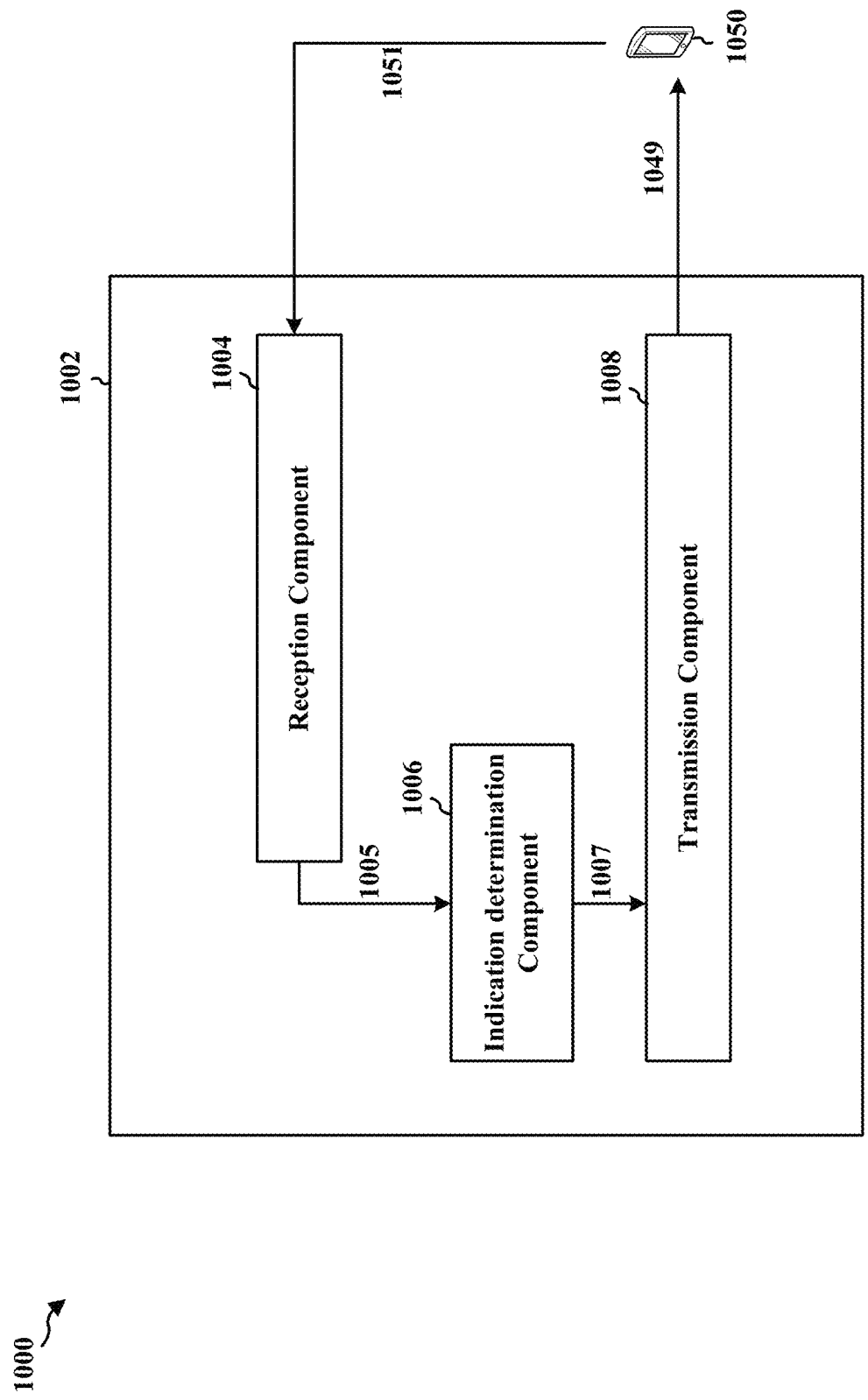
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be an eNB. The apparatus includes a reception component 1004 that receives signaling 1051 from the UE 1050. The signaling 1051 may include the UE antenna capability information 504 and communication in accordance with the indication 506. The indication determination component 1006 receives the UE antenna capability information 504 via the signaling 1005 and determines indication to operate the antenna subarray with the at least one polarization is transmitted. The indication (e.g., indication 506) may include beam pairs and/or codebook restrictions. The transmission component 1008 receives the indication from the indication determination component 1006 via the signaling 1007 and transmits the signaling 1049 to the UE 1050. The signaling 1049 may include the indication 506 and communication with the UE 1050 in accordance with the indication 506.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
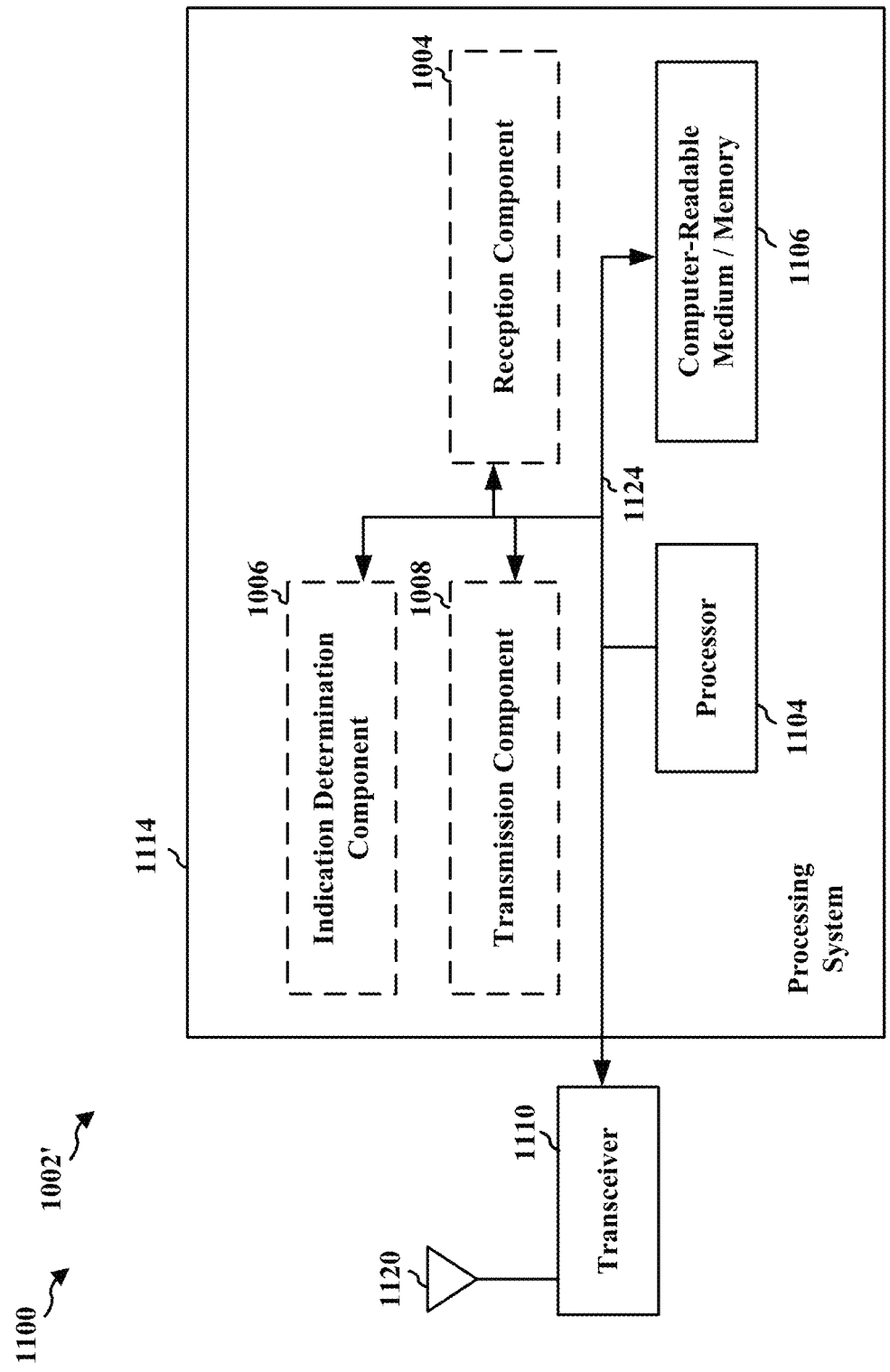
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication includes means for receiving, from a UE, antenna capability information of the UE, the antenna capability information comprising identification information of each of one or more antenna subarrays of the UE and polarization information indicating at least one polarization supported by each of the one or more antenna subarrays; means for transmitting an indication to operate each of the one or more antenna subarrays with one or more of the at least one polarization; and means for communication according to the indication. In an aspect, the apparatus 1002/1002' may further include means for an inquiry for UE capability information, where the antenna capability information is received in response to the inquiry from the base station. In an aspect, the means for communicating according to the indication is configured to receive channel state information. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication by a user equipment (UE), comprising:
   receiving, from a base station, an inquiry for UE capability information of the UE in a first radio resource control (RRC) message, the inquiry including a request for dual polarization capabilities of the UE;
   reporting antenna capability information of the UE in a dual polarization field of a UE capability information message of a second RRC message, the antenna capability information comprising identification information of each of one or more antenna subarrays and polarization information indicating a number of the one or more antenna subarrays that supports dual polarization;
   receiving an indication, based on the reported antenna capability information of the UE, to operate an antenna subarray in the number of the one or more antenna subarrays with the dual polarization and dual beam pairs as part of a beamforming process; and
   communicating according to the indication and as part of the beamforming process.

2. The method of claim 1, wherein the polarization information further indicates whether at least one of single polarization or dual polarization is supported by each of the one or more antenna subarrays.

3. The method of claim 1, wherein the antenna capability information is reported in response to the inquiry from the base station.

4. The method of claim 3, wherein the inquiry is received in an RRC connected state.

5. The method of claim 3, wherein the inquiry includes a request for information of polarization supported by the UE.

6. The method of claim 1, wherein the indication comprises a codebook restriction of polarization for each of the one or more antenna subarrays.

7. The method of claim 6, Wherein the indication further comprises a restriction on a transmission rank for each of the one or more antenna subarrays.

8. The method of claim 6, wherein the communicating according; to the indication comprises:
reporting channel state information.

9. The method of claim 6, wherein the indication comprises pairing information of each of the one or more antenna subarrays with antenna information of the base station.

10. A method for wireless communication by a base station, comprising:
transmitting, to a user equipment (UE), an inquiry for UE capability information of the UE in a first radio resource control (RRC) message, the inquiry including a request for dual polarization capabilities of the UE;
receiving, from the UE in a dual polarization field of a UE capability information message of a second RRC message, antenna capability information of the UE, the antenna capability information comprising identification information of each of one or more antenna subarrays of the UE and polarization information indicating a number of the one or more antenna subarrays that supports dual polarization;
transmitting, based on the received antenna capability information of the UE, an indication to operate an antenna subarray in the number of the one or more antenna subarrays with the dual polarization and dual beam pairs as part of a beamforming process; and
communicating according to the indication and as part of the beamforming process.

11. The method of claim 10, wherein the polarization information further indicates whether at least one of single polarization or dual polarization is supported by each of the one or more antenna subarrays.

12. The method of claim 10, wherein the antenna capability information is received in response to the inquiry from the base station.

13. The method of claim 12, wherein the inquiry is transmitted in an RRC connected state.

14. The method of claim 12, wherein the inquiry includes a request for information of polarization supported by the UE.

15. The method of claim 10, wherein the indication comprises codebook restriction of polarization for each of the one or more antenna subways in the UE.

16. The method of claim 15, wherein the indication further comprises restriction of a transmission rank for each of the one or more antenna subarrays in the UE.

17. The method of claim 15, wherein the communicating according to the indication comprises:
receiving channel state information.

18. The method of claim 15, wherein the indication comprises pairing information of each of the one or more antenna subarrays with antenna information of the base station.

19. A user equipment (UE) for wireless communication, comprising:
a memory; and
at least one processor coupled to the memory and configured to:
receive, from a base station, an inquiry for UE capability information of the UE in a first radio resource control (RRC) message, the inquiry including a request for dual polarization capabilities of the UE;
report antenna capability information of the UE via a dual polarization field of a UE capability information message of a second RRC message, the antenna capability information comprising identification information of each of one or more antenna subarrays and polarization information indicating a number of the one or more antenna subarrays that supports dual polarization;
receive an indication, based on the reported antenna capability information of the UE, to operate an antenna subarray in the number of the one or more antenna subarrays with the dual polarization and dual beam pairs as part of a beamforming process; and
communicate according to the indication and as part of the beamforming process.

20. The UE of claim 19, wherein the polarization information further indicates whether at least one of single polarization or dual polarization is supported by each of the one or more antenna subarrays.

21. The UE of claim 19, wherein the reporting of the antenna capability information is in response to the inquiry from the base station.

22. The UE of claim 21, wherein the inquiry includes a request for information of polarization supported by the UE.

23. The UE of claim 19, wherein the indication comprises a codebook restriction of polarization for each of the one or more antenna subarrays.

24. The UE of claim 23, wherein the indication comprises pairing information of each of the one or more antenna subarrays with antenna information of the base station.

25. A base station for wireless communication, comprising:
a memory; and
at least one processor coupled to the memory and configured to:
transmit, to a user equipment (UE), an inquiry for UE capability information of the UE in a first radio resource control (RRC) message, the inquiry including a request for dual polarization capabilities of the UE;
receive, from the UE in a dual polarization field of a UE capability information message of a second RRC message, antenna capability information of the UE, the antenna capability information comprising identification information of each of one or more antenna subarray and polarization information indicating a number of the one or more antenna subarrays that supports dual polarization;
transmit, based on the received antenna capability information of the UE, ara indication to operate an antenna subarray in the number of the one or more antenna subarrays with the dual polarization and dual beam pairs as part of a beamforming process; and
communicate according to the indication and as part of the beamforming process.

26. The base station of claim 25, wherein the polarization information further indicates whether at least one of single polarization or dual polarization is supported by each of the one or more antenna subarrays.

27. The base station of claim 25, wherein the antenna capability information is received in response to the inquiry from the base station.

28. The base station of claim 27, wherein tile inquiry includes a request for information of polarization supported by the UE.

29. The base station of claim 25, wherein the indication comprises codebook restriction of polarization for each of the one or more antenna subarrays in the UE.

30. The base station of claim 29, wherein the indication comprises pairing information of each of the one or more antenna subarrays with antenna information of the base station.

* * * * *